United States Patent [19]

Jones et al.

[11] Patent Number: 4,558,438

[45] Date of Patent: Dec. 10, 1985

[54] METHOD AND APPARATUS FOR DYNAMICALLY DISPLAYING GEO-PHYSICAL INFORMATION

[75] Inventors: Richard C. Jones, Cheswick; John M. Powell, Aspinwall, both of Pa.

[73] Assignee: Gulf Research & Development Company, Pittsburgh, Pa.

[21] Appl. No.: 335,205

[22] Filed: Dec. 28, 1981

[51] Int. Cl.[4] .......................... G01V 1/34; G11C 8/00
[52] U.S. Cl. ...................................... 367/71; 340/728; 358/182; 364/900; 367/70
[58] Field of Search .................... 367/68, 69, 71, 72, 367/70, 73; 340/752, 755, 725, 723, 724, 726, 727, 728; 346/33 C; 364/421, 518, 521; 343/5 DP; 315/392; 358/182

[56] References Cited

U.S. PATENT DOCUMENTS

| | | | |
|---|---|---|---|
| 4,063,216 | 12/1977 | Chapman et al. | 367/72 |
| 4,210,964 | 7/1980 | Rogers et al. | 367/70 |
| 4,223,353 | 9/1980 | Keller et al. | 340/793 |
| 4,237,457 | 12/1980 | Houldsworth | 340/793 |
| 4,462,024 | 7/1984 | Strolle | 340/727 |

Primary Examiner—T. H. Tubbesing
Assistant Examiner—K. R. Kaiser
Attorney, Agent, or Firm—Roylance, Abrams, Berdo & Goodman

[57] ABSTRACT

In a system for displaying geophysical information on a video screen, data representative of spaced subsurface strata are stored in a computer memory. The data are extracted, plane by plane, and data bytes representative of the planes are stored in pairs in memories in an image processor. The data representative of one plane is displayed and recorded on a medium such as video tape. An image is then formed using a large fraction of the value of the data representative of one plane and a smaller fraction of the data representative of the next plane, and that image is stored. Successive images are formed using decreasing fractional amounts of the data representative of the first plane and increasing fractional amounts of the data in the next plane. Each image is stored and displayed, the display presenting a sequence of images which appear to merge or dissolve smoothly from one to the next. The process is repeated through all stored strata.

5 Claims, 5 Drawing Figures

METHOD AND APPARATUS FOR DYNAMICALLY DISPLAYING GEO-PHYSICAL INFORMATION

This invention relates to a method for dynamically displaying data representative of the interior of a solid body, particularly the subsurface regions of the earth, from data derived from the surface of the body.

BACKGROUND OF THE INVENTION

One of the most difficult aspects of geophysical exploration has, from the early effort in the field, been the analysis and evaluation of data about subsurface formations in the earth. Drilling a hole in the earth to depths at which oil or gas can be expected to exist is a very expensive process. Thus, much effort has gone into the study of techniques to gain information about what exists below the surface in an effort to predict where deposits of interest might be found, and to predict the most profitable regions where bore holes can be drilled.

One of the most significant of these techniques is in the field of seismology in which acoustic energy is transmitted into the earth and reflections are received from the interfaces between strata. Normally, acoustic energy is produced at or near the surface and the reflections are received by an array of geophones arranged in a line or some other array. There are various techniques for repeatedly relocating the source and the geophones to produce, at the geophones, reflection energy which can be recorded and analyzed. Much work has been done to improve the data processing techniques and analysis to mimimize noise and to emphasize characteristics representative of subsurface formations, and also in the areas of identifying not only differences in velocity through various strata but also indicating the differences in velocity between adjacent strata in terms of ratios. Workers in the field have learned how to correct and strengthen the information received, and the reliability of the information has increased dramatically in recent years.

There remains, however, the problem of making sense out of the processed data after all of these corrections have been made. In the final analysis, a geophysicist or geologist must somehow look at the data and, using his training and experience, determine the significance of the information which has been received and processed. An experienced geologist commonly looks at a series of diagrams formed from the data, commonly constituting lines which "wiggle" across a sheet of paper and determine what these lines mean as far as the liklihood of hydrocarbon deposits is concerned. Graphical presentations in which sections of the data are shaded or colored have been produced to help him with this analysis, i.e., to help him visualize the subsurface formations and their interrelationships.

There have been several efforts to devise techniques for producing three dimensional representations of a subsurface region to assist with this visualization. Examples of these are found in the following documents.

U.S. Pat. No. 3,434,568—Caldwell
U.S. Pat. No. 3,484,740—Cook
U.S. Pat. No. 3,539,981—Sattlegger
U.S. Pat. No. 3,638,178—Stephenson
U.S. Pat. No. 3,668,619—Dennis
U.S. Pat. No. 3,931,609—Anstey
U.S. Pat. No. 4,030,064—Elliott
U.S. Pat. No. 4,032,912—Wood
U.S. Pat. No. 4,063,216—Chapman et al
U.S. Pat. No. 4,078,177—Tiemens
U.S. Pat. No. 4,210,964—Rogers et al
U.S. Pat. No. 4,241,429—Bloomquist et al Recently, an additional technique has been devised in which charts are made of horizontal slices through the earth, in successive planes, the information having been derived from seismic information which is normally presented as being representative of vertical slices through the earth. The technique involves manually constructing, from depth information given in the vertical sections, reflection information about horizontal sections. Thus, a sequence of still pictures representing horizontal slices is produced, and these horizontal sections are photographed on successive groups of frames of motion picture film (or on video tape) and the result is projected or displayed in the form of a motion picture. This technique is somewhat similar to certain techniques for producing animated cartoons in which a sequence of still pictures, when sequentially photographed and projected, gives the illusion of motion. Thus, the viewer has the ability to "look" at successive layers of subsurface formations, in sequence, and can better visualize the changing shapes of formations as depth increases.

Unfortunately, the process of producing the sequence of horizontal slices is extremely time consuming, laborious and expensive, and the effect of the final product leaves something to be desired because the resolution is not sufficiently good to permit seeing relatively small changes, and the movement from one image to the next is jerky because the data points are not sufficiently close together to permit the images to sequentially blend into each other. Because of the fact that the information is manually transferred from one coordinate system to another, and the result is then photographed, the resolution is seriously degraded, and many features are not visible or detectable at all.

BRIEF DESCRIPTION OF THE INVENTION

An object of the present invention is to provide a significantly improved system for dynamically displaying seismic information so that a viewer can observe a substantially continuously changing presentation of horizontal slices through subsurface formations, as depth increases, and can observe the existance of and changes in the formations in a clear manner with excellent resolution.

As will be recognized, although this technique was initially developed for use in connection with analysis of earth formations based on seismic information and is highly useful for that purpose, the technique is also directly applicable to viewing successive planes through any solid body based on data obtained from other acoustic or radiographic investigation techniques such as ultrasonic analysis of the interior of the human body. The only fundamental difference is a rather drastic change in the scale of the object which is being analyzed. Nevertheless, the technique will be described herein in the context of subsurface investigation.

Briefly described, the invention includes a method of forming for display a sequence of images comprising providing first and second memories, storing in said first memory a matrix of data bytes representative of locations in a first plane, storing in said second memory a matrix of data bytes representative of locations in a second plane parallel with the first plane, fetching from the first memory the bytes stored therein, converting the fetched bytes into signals in a form usable to produce a display on a video screen and recording the converted signals on a magnetic storage medium, selectively fetching from the first memory a large percentage of the value of each of the data bytes stored therein and from the second memory a small percentage of the value of each of the data bytes stored therein, and summing the two percentage values to form an interpolation image, the bytes fetched from the first and second memories representing locations distributed throughout the planes, converting the summed values into signals in a form usable to produce a video display and recording the converted signals on the storage medium in sequence after the earlier stored signals, repeating the steps of selectively fetching, converting and sequentially recording using, in each successive representation, a decreased percentage of the value of bytes from said first memory and an increased percentage of the value of bytes from said second memory until, in the last repetition, the percentage used from said first memory is zero; and displaying the sequence of signals stored on said medium.

In another aspect the invention includes a method of forming a sequence of images representing successive sections within a body comprising forming in a first memory a matrix store of bytes defining data points representing points contained in a series of planar regions within the body, each point having identifiable location characteristics and an intensity characteristic; selectively extracting from the first memory a first set of bytes defining a set of data points representing locations lying in a first predetermined planar region in the body which can include points lying in more than one of the stored series of regions and storing the extracted bytes in a second memory; selectively extracting from the first memory a second set of bytes defining a set of data points representing locations lying in a second planar region parallel with the first planar region and storing the second set of bytes in a third memory; converting the bytes stored in the second memory into a signal form displayable on a CRT as a visually perceivable image representative of the first planar region; recording the converted signals on a recording medium; selectively extracting a predetermined small percentage of the value of the bytes from the data points stored in the third memory and a predetermined larger percentage of the value of the bytes from the data points stored in the second memory, the extracted bytes from the two memories representing locations in the two planar regions and the total of the percentages equalling substantially 100%; converting the selectively extracted byte values into a signal form displayable on a CRT; recording the converted signals on a recording medium; repeating the steps of selectively extracting, converting the selectively extracted byte values and recording the converted signals a predetermined number of times, each time extracting a larger percentage of the values of the bytes from the third memory and a smaller number of the values of the bytes from the second memory until the percentage extracted from the second memory is zero, thereby forming on the recording medium a sequence of signal sets displayable as a sequence of images merging smoothly from the first planar region to the second planar region.

In order that the manner in which the foregoing and other objects are attained in accordance with the invention can be understood in detail, particularly advantageous embodiments thereof will be described with reference to the acompanying drawings, which form a part of this specification, and wherein.

Figure 1:
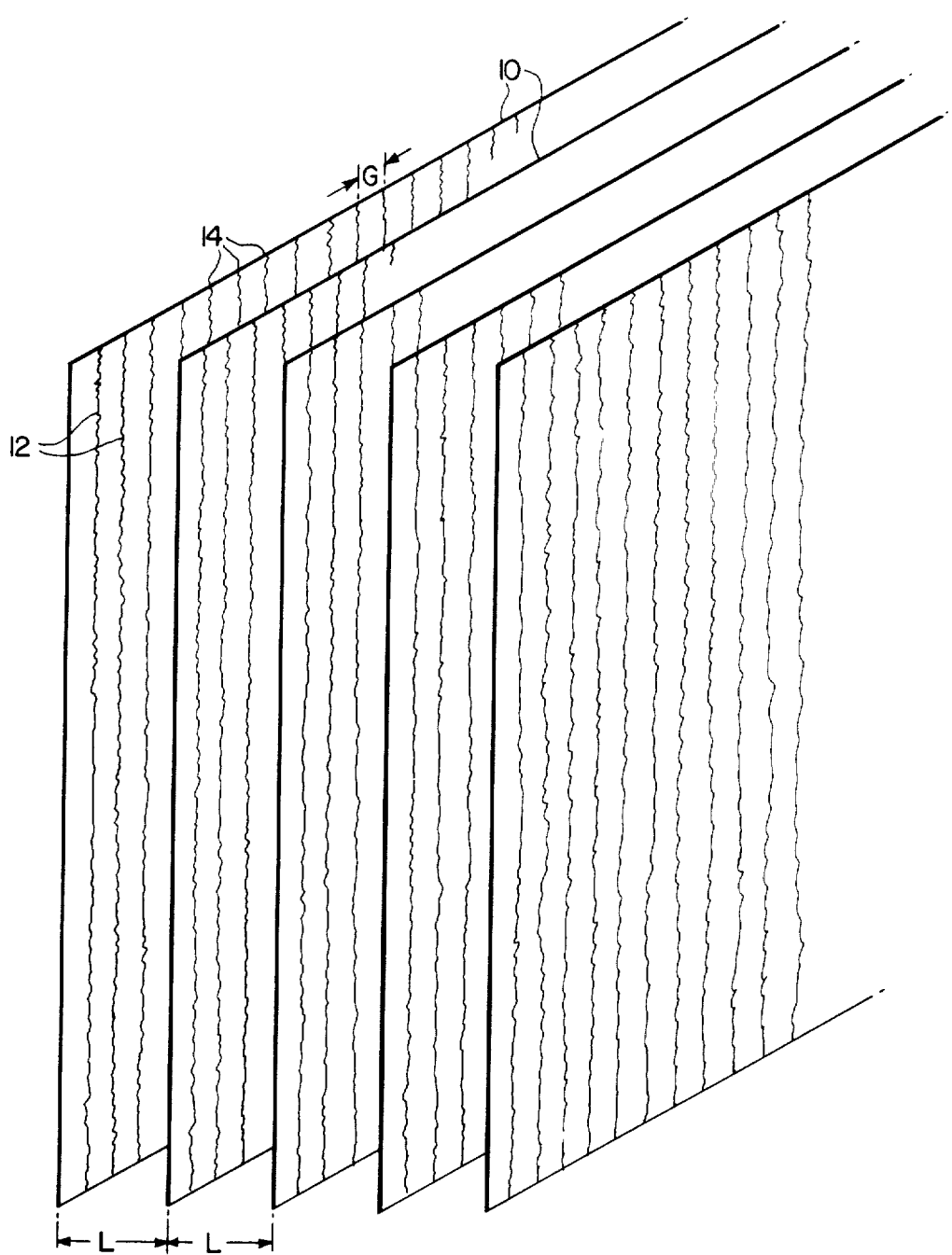
FIG. 1 is a pictorial representation of the data gathered from a region which has been explored, which representations are to be processed and displayed.

The process begins with data from seismic surveys made in the field in ways which are now conventional. Data points are developed from seismic reflections and those data points are "corrected" in well-known ways to adjust for aberrations in the acoustic energy paths. The result is a collection of data points which can be thought of as representing a cube of data consisting of a number of vertical panels the top of which are the lines along which geophones were arranged and, therefore, along which the seismic survey was originally made. A simplified representation of a few of the panels in such a cube are shown in FIG. 1. Along each geophone line 10 are the tops of a series of traces 12, commonly on the order of one thousand, each trace extending downwardly into the cube from points 14 which are in locations equivalent to the geophone locations, these traces having intensity variations representative of the differing reflection characteristics of the subsurface formations. Typically, the traces along each line are separated by distances G representative of a spacing between geophones of about 25 meters, and the lines themselves are separated by a spacing L representative of, commonly, 75 meters on the surface of the earth.

The wiggles of the original traces represent a series of data points which contain information about the subsurface formations. These data points are put into a digital form and are stored in the disc storage of a main computer. Each panel thus stored represents a two-dimensional array of points, each point having an intensity characteristic. Each panel can thus be thought of as having horizontal rows of points which are at different depths, or which can be thought of as being at different times, speaking in terms of reflection times relative to the surface.

Figure 2:
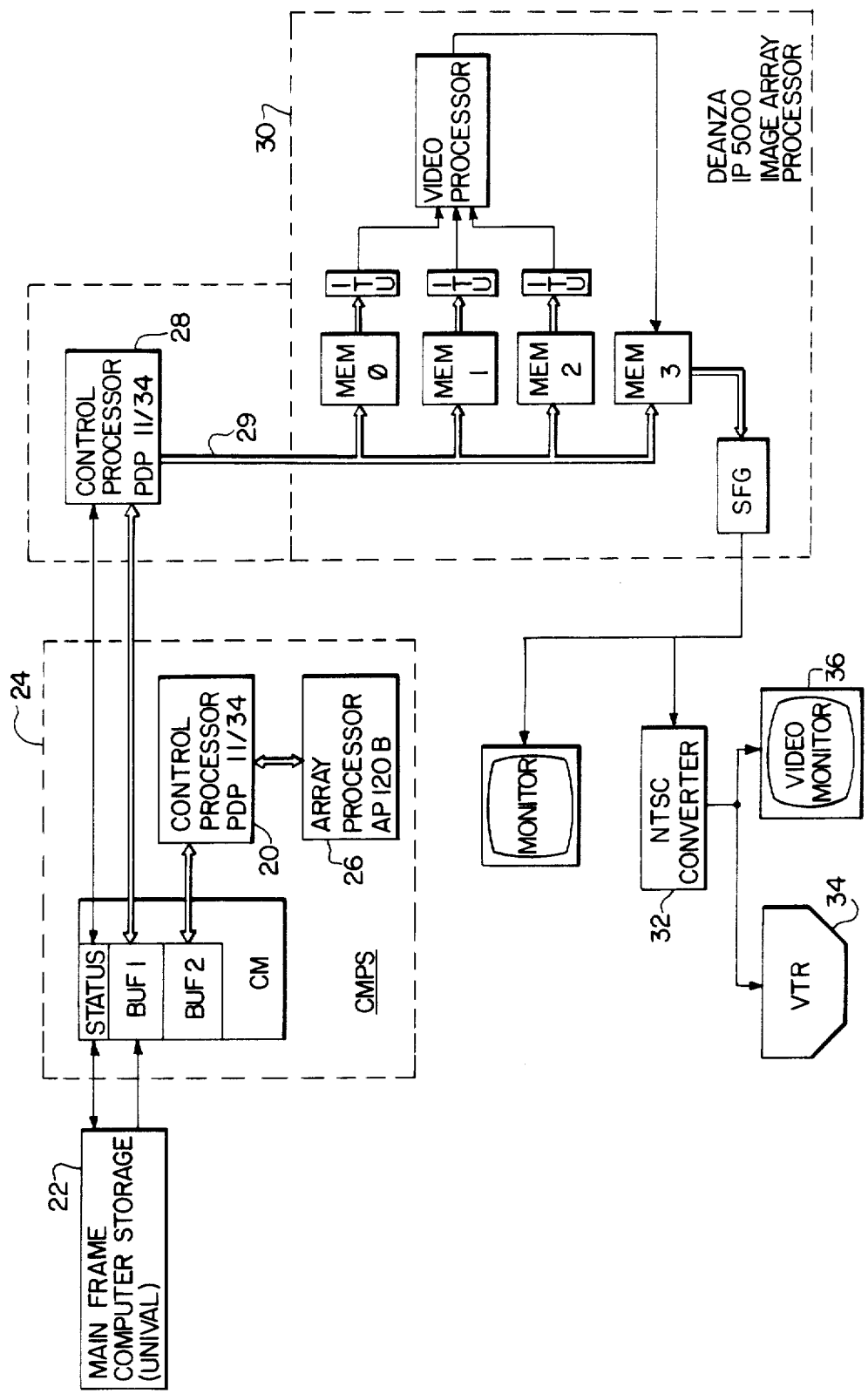
FIG. 2 is a schematic block diagram of a system in accordance with the invention.

Referring now to FIG. 2 in conjunction with FIG. 1, to arrange this data for successive depth displays, a control processer 20 calls up from the main frame computer storage 22 all of the data points which are at the same depth from all of the panels, and transfers that block of data to the central memory CM of a central memory processing system (CMPS) 24. Because of the fact that the spacing is different in one direction (e.g. X) from the other (Y), a mathematical interpolation is accomplished in the CMPS 24 by an array processor 26. With spacing between lines of 75 meters, two interpolations are made between lines so that the spacing in both the X and Y directions in the data point array is 25 meters. This results in a rectangular array representing a horizontal panel of data points which represents a horizontal slice through the cubic section of the earth. This is done for each depth (or reflection time) in sequence.

The data point digital data is then scaled to be compatible with display equipment and, additionally, the intensity information is identified, using, for example, a look-up table technique, with each of several possible signal intensities being represented by a color.

A control processor 28, such as a Digital Equipment Corp. model PDP-11, then reads out this horizontal panel and supplies the points, line by line, on bus 29 to memories in an image array processor 30 such as a Deanza model IP5000 which has four memories identified as MEM 0, MEM 1, MEM 2 and MEM 3. A title block can first be displayed by transferring the data defining the desired display to MEM 3. However, this image is not otherwise processed and will not be further described in detail. The first panel of data points is transferred to memory 0, the next panel of data points is transferred to memory 1, and the last arriving panel of data points is supplied to memory 2. As will be recognized from the following, portions of the data values from memories 0, 1 and 2 are extracted in pairs, passed through intensity transformation units (ITU) of which there is one for each of MEM 0, 1 and 2, and through a video processor, and stored in MEM 3, the content of which is always displayed. Thus, MEM 3 acts as repository for images being formed. This process is repetitive. The data bytes from memory 3 are read out nondestructively and can be displayed on a monitor 31. The data is put through a standard NTSC conversion in a converter 32 so that the signals are compatible with conventional television display equipment and are capable of being displayed as an image, and the signals are then recorded in a video tape recorder 34 on magnetic video tape. They can also be concurrently or subsequently displayed on a standard color video receiver 36.

After a finite interval the displayed and recorded image is modified by displaying a mixture of the values of the data bytes stored in memories 0 and 1. For example, 1/32 of the values of all points in the image in memory 1 is displayed with 31/32 of the values of all points in the image from memory 0. After another interval, the display is again modified so that 2/32 of the memory 1 image is used and 30/32 from memory 0. The intervals between these changes are typically 3–4 milliseconds. This sequence of mixing images continues until the image from memory 0 has been completely replaced by that from memory 1. The memory 1 image is then replaced in a similar fashion by the memory 2 image while a new image is being loaded into memory 0. This process thus creates a sequence of merged images which can be thought of as non-mathematical interpolations or progressive dissolves between images which are transitory insofar as the memories in the image array processor is concerned, but all of which are recorded on the video tape, thus producing a recorded series of images which, when reproduced on a video screen and viewed, appear to merge smoothly into each other from one horizontal pattern representing one depth into the next horizontal pattern representing the next depth. The viewed monitor thus presents the illusion of travelling down through the earth.

As will be recognized, the points constituting each image, or a portion of each image, as it is merged into the next are evenly distributed through out the image so that portions of the entire image or chosen image portion change at the same time.

Each display is produced in color with the colors being chosen, as indicated above, to illustrate the direction and intensity of the reflections. For example, light blue can be used to represent those points which are high intensity positive reflections, and the color can be chosen to vary from that light blue to black as one moves, in the intensity scale, toward a null reflection, and into brown for negative reflections, the highest intensity negative reflection again being a bright brown or orange color. Thus, bright spots indicating regions of high geological interest are readily visible and recognizable. More importantly, the changes in shape of each formation as one progresses "downwardly" are readily visible.

A similar technique can be used to produce progressive displays in directions other than down. One can, for example, choose to produce displays parallel to a vertical plane. The same basic process is used except that the block of data initially chosen to represent the first panel are data points in a vertical plane, and successive panels are parallel to that initial panel.

The video tape thus produced can be repeatedly displayed and stopped to permit analysis by a geophysicist or geologist at any location, the only equipment necessary being a standard video recorder and monitor.

It is also possible, using the inital processing equipment, to produce a "zoom" effect, choosing a small portion of one panel and distributing it over the entire display screen. Because of the fact that the resolution is extremely high, this enlargement permits viewing, at a larger scale, those formations which are of particular geological interest. The same technique can, of course, be used with the zoom effect to produce successive displays representing successive layers travelling in any direction chosen.

Figure 3:
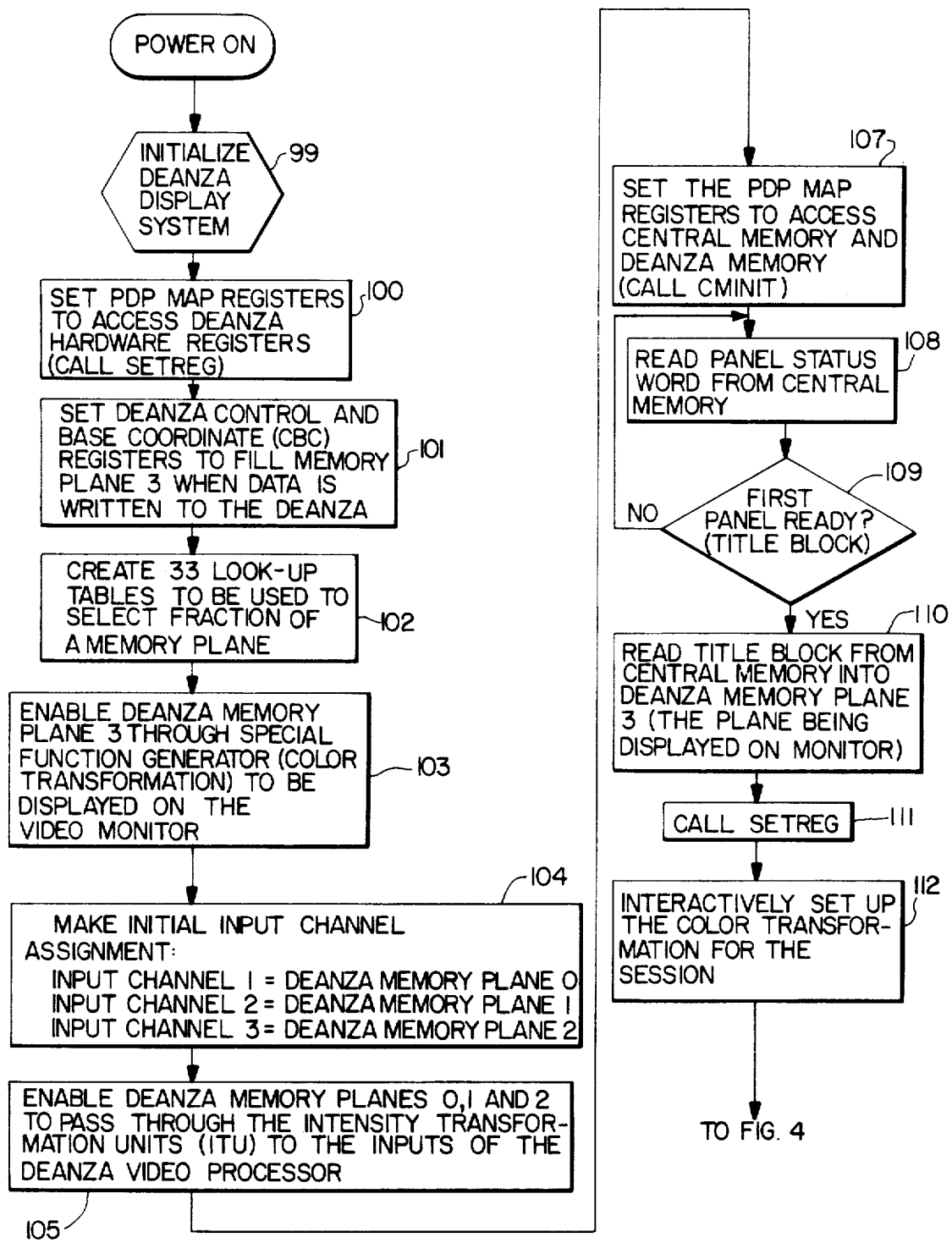
FIGS. 3–5 are a flow chart showing the program steps used in a preferred embodiment of the invention.
Figure 4:
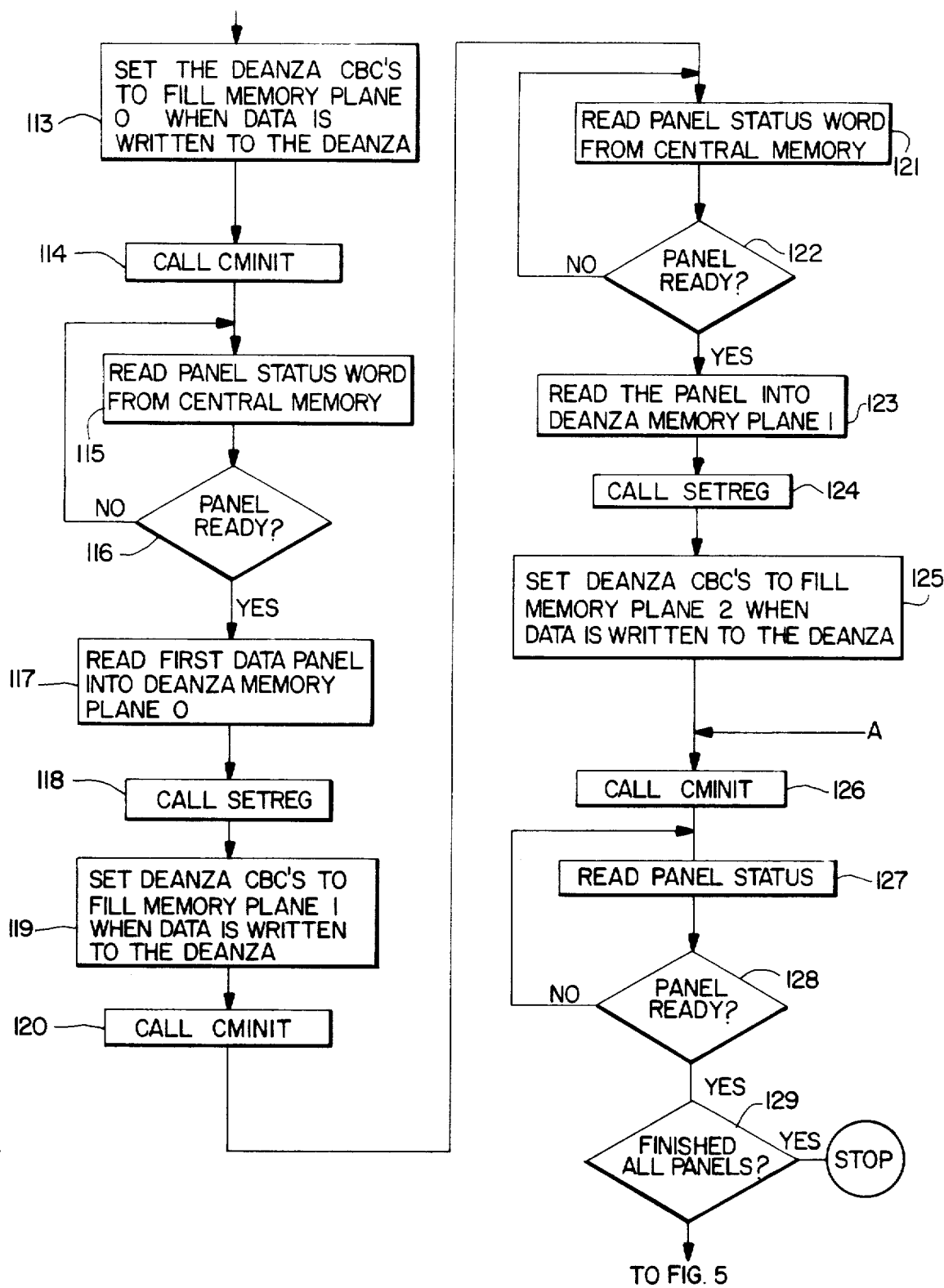
Figure 5:
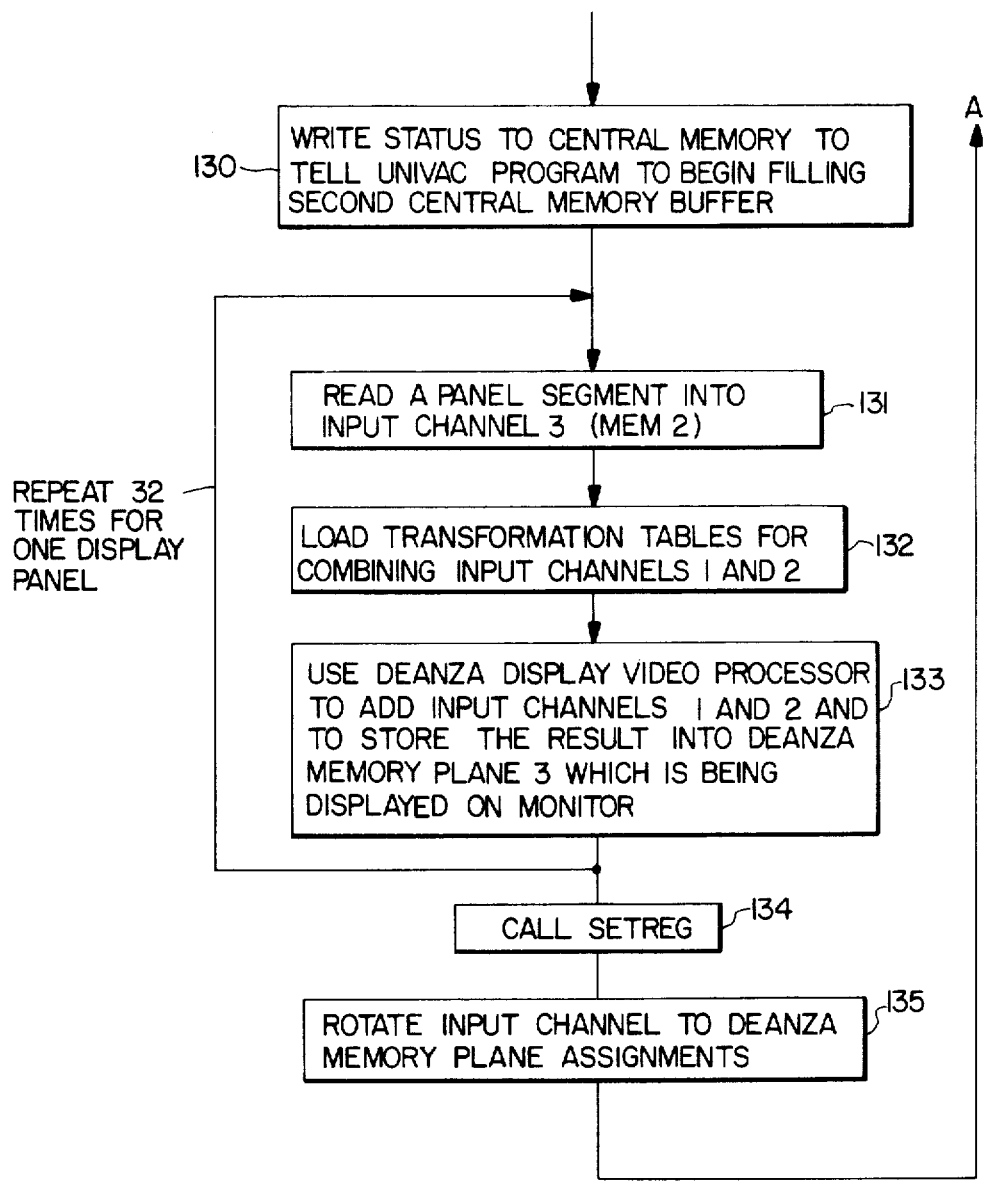

FIGS. 3–5 show and describe the program steps and sequencing used to operate the apparatus of FIG. 2. The program itself, which is conveniently written in FORTRAN, resides in the mainframe 22, in the CMPS 24, and in the control processor 28 and IAP 30 which are so interconnected as to be best viewed as a single functional unit.

The program begins, when power is supplied, by initialzing the DEANZA IAP system at 99. At 100, the PDP (28) map registers are then set to access the IAP hardware registers, enabling the mapping registers to access specific registers in the IAP. This subroutine is termed CALL SETREG and will be referred to as such later in the program. At 101, the controls are set to initially fill MEM 3 when data is written to the IAP. At 102, look-up or transformation tables are created to choose the proper portions of the memory planes later in the process. These tables determine the amounts of the data to be used, i.e., in 1/32 increments as described previously, to select portions of the values of the bytes from the planar regions.

At 103, the DEANZA IAP memory plane 3 is enabled so that data subsequently stored therein can be displayed. At 104, channels are initially assigned to specific ones of the memories to determine the sequence in which data will be read into these memories. Note that the assignment listed is initial only and that the channel assignments will change as the system uses different pairs of memories to produce images.

At 105, the memory planes 0, 1 and 2 are enabled so that data stored can be passed through the ITU's and video processor to MEM 3 for display. At 107 a routine CALL CMINIT sets the PDP 28 map registers to access the central memory. At 108, the data panel status word is read from central memory. This establishes a handshake with the UNIVAC maniframe, the status word having been deposited in central memory in Unit 24 from the mainframe. If the first panel is ready, decision point 109 permits the title block to be read (110) into MEM 3 which is the memory plane being displayed. That block is merely displayed, not merged into another image, and can be held. The CALL SETREG routine is repeated at 111. At 112, quantities representing intensities are assigned colors to be displayed. This can be a look-up table.

At 113, the Deanza CBC's are set to fill MEM 0. It will be noted that this is necessary because the IAP does not recognize the originally assigned channel numbers. This step completes the path to direct data to the proper memory. In 114, CALL CMINIT is performed again. Steps 115 through 125 are repititions of prior steps to fill MEM 1 and to prepare MEM 2.

At 126, the recirculation portion of the programs begins with CALL CMINIT, and decisions 128 and 129. At 131, a panel segment is read into channel 3 (in this case, to MEM 2) and the look-up tables for combining channels 1 and 2 are loaded. Then, at 133 channels 1 and 2 are added in accordance with the percentages or fractions dictated by the data stored in those tables to form an image which is then stored in MEM 3 and displayed. This is repeated 32 times to form the succession of images as described. Additionally, the memory which is not at that time being used to produce a display is concurrently filled in 32 steps. At 134, CALL SETREG is repeated. At 135 the channels are reassigned and the program returns to 126 for the next pair of memories. When all data planes from the mainframe which are to be displayed have been displayed, this fact is indicated by a status word from the mainframe. That word is recognized at 129 and the program is stopped.

While certain advantageous embodiments have been chosen to illustrate the invention it will be understood by those skilled in the art that various changes and modifications can be made therein without departing from the scope of the invention as defined in the appended claims.

What is claimed is:

1. A method of forming for display a sequence of images representative of a body at a particular time comprising:

providing first and second memories, storing in said first memory a matrix of data bytes representative of locations in a first plane, storing in said second memory a matrix of data bytes representative of locations in a second plane parallel with the first plane, fetching from the first memory the bytes stored therein, converting the fetched bytes into signals usable to produce a display on a video screen and recording the converted signals on a magnetic storage medium, selectively fetching from the first memory a first percentage of the values of data bytes stored therein and from the second memory a second percentage of the values of data bytes stored therein, said first percentage being initially larger than said second percentage, the bytes fetched from the first and second memories representing differing locations distributed throughout the planes, converting the selectively fetched bytes into signals usable to produce a video display and recording the converted signals on the storage medium in sequence after the earlier stored signals;

repeating the steps of selectively fetching, converting and sequentially recording while, in each representation, decreasing said first percentage of the bytes from said first memory and increasing said second percentage of the bytes from said second memory until, in the last repetition, said first percentage from said first memory is zero; and displaying the sequence of signals stored on said medium in the manner of a motion picture dissolve to thereby create an illusion of motion through said body.

2. A method of forming a sequence of images representing successive sections within a body at a particular time comprising forming in a first memory a matrix store of bytes defining data points representing points contained in a series of planar regions within the body, each point having identifiable location characteristics and an intensity characteristic;

selectively extracting from the first memory a first set of bytes defining a set of data points representing locations lying in a first predetermined planar region in the body which can include points lying in more than one of the stored series of regions and storing the extracted bytes in a second memory;

selectively extracting from the first memory a second set of bytes defining a set of data points representing locations lying in a second planar region parallel with the first planar region and storing the second set of bytes in a third memory;

converting the bytes stored in the second memory into a signal form displayable on a CRT as a visually perceivable image representative of the first planar region;

recording the converted signals on a recording medium;

selectively extracting a first percentage of the values of bytes from the data points stored in the third memory and a second percentage of the value of the bytes from the data points stored in the second memory, said first percentage initially being smaller than said second percentage, the extracted bytes from the two memories representing locations in the two planar regions and the total of said first and second percentages equalling substantially 100%;

converting the selectively extracted bytes into a signal displayable on a CRT;

recording the converted signals on a recording medium; and repeating the steps of extracting, converting the extracted bytes and recording the converted signals a predetermined number of times, each time increasing said first percentage of the value of the bytes extracted from the third memory and decreasing said second percentage of the value of the bytes extracted from the second memory until the second percentage extracted from the second memory is zero, thereby forming on the recording medium a sequence of signal sets displayable as a sequence of images, said sequence of images created by said repeated steps of extracting, converting and recording merging smoothly from the first planar region to the second planar region in the manner of a video dissolve when the recorded converted signals are displayed on a CRT to thereby create an illusion of motion through the body.

3. The method of claim 2, wherein said body is a section of the earth, wherein said data points are taken from seismic sections which are generally vertically oriented in the earth, wherein said series of images are generally horizontally oriented across said vertically oriented seismic sections, and the step of displaying said sequence of images in the manner of a motion picture dissolve to thereby generate an illusion of motion;

whereby an observer viewing said images can in effect visually move vertically through the section of the earth under study to thereby visualize changing formations therein as depth therein changes.

4. The method of claim 2, wherein said body is a section of the earth, wherein said data points are taken from seismic sections which are generally vertically oriented in the earth, wherein said series of images are oriented on planes other than generally horizontal planes in said section of the earth, and the step of displaying said sequence of images in the manner of a motion picture dissolve to thereby generate an illusion of motion through the section of the earth under study in a direction generally perpendicular to the orientation of said non-horizontal planes to thereby visualize changing formations in said section of the earth as the effectual visual location of the observer changes.

5. The method of claim 4, and the step of color coding the seismic data so that the observer is presented simultaneously with said illusion of motion through the formations and with color changes indicative of changes in the seismic information in the data, and said illusion of motion and said changes in seismic information being independent of each other.

* * * * *